US005564522A

United States Patent [19]

Markin et al.

[11] Patent Number: 5,564,522

[45] Date of Patent: Oct. 15, 1996

[54] MULTI-PURPOSE VEHICLE

[76] Inventors: Hugh A. Markin, 2806 Brookmere Rd., Charlottesville, Va. 22901; Brian A. Markin, 556 Lee Ave., Harrisonburg, Va. 22801

[21] Appl. No.: 283,510

[22] Filed: Aug. 1, 1994

[51] Int. Cl.[6] .......... B25J 5/00

[52] U.S. Cl. .......... 182/2; 182/63

[58] Field of Search .......... 182/2, 63, 141

[56] References Cited

U.S. PATENT DOCUMENTS

| | | | |
|---|---|---|---|
| 2,954,092 | 9/1960 | Thornton | 182/2 |
| 3,043,395 | 7/1962 | Volkel | 182/2 |
| 3,250,343 | 5/1966 | Maloney | 182/2 X |
| 3,319,739 | 5/1968 | Morse | 182/2 |
| 3,937,340 | 2/1976 | Grove | 214/147 |
| 4,169,511 | 10/1979 | Brown | 182/2 X |
| 4,657,109 | 4/1987 | Sterner | 182/2 |
| 5,286,159 | 2/1994 | Honma | 182/2 X |

*Primary Examiner*—Alvin C. Chin-Shue
*Attorney, Agent, or Firm*—John J. Byrne

[57] ABSTRACT

A multi-purpose vehicle of a type having the ability to swing about a vertical axis like a turret and having a two-member boom pivotable about a horizontal axis with an operator's cage at its distal end. Controls are available at the cage for locating and manipulating various construction materials and equipment essential to the efficient construction of the post frame building.

7 Claims, 6 Drawing Sheets

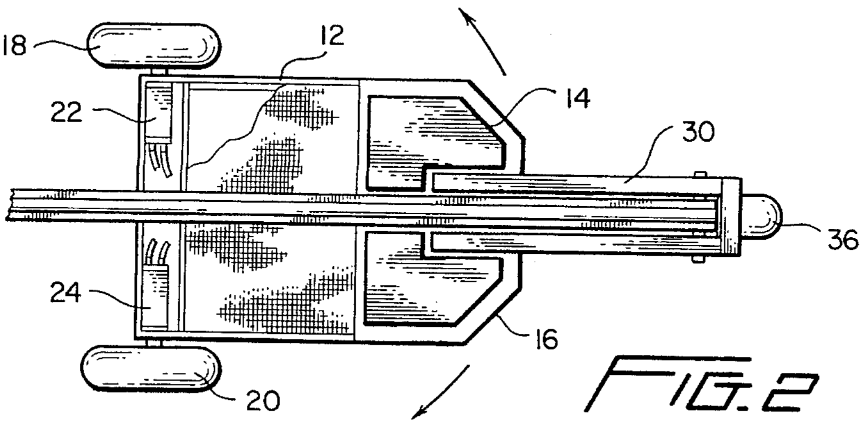
FIG. 2
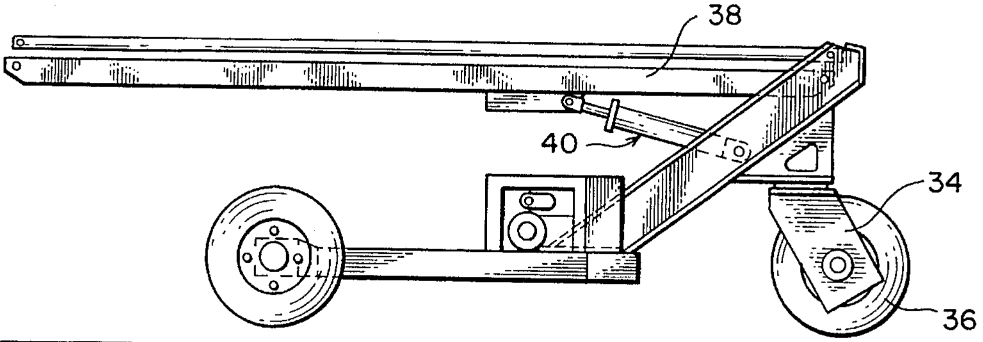
FIG. 3
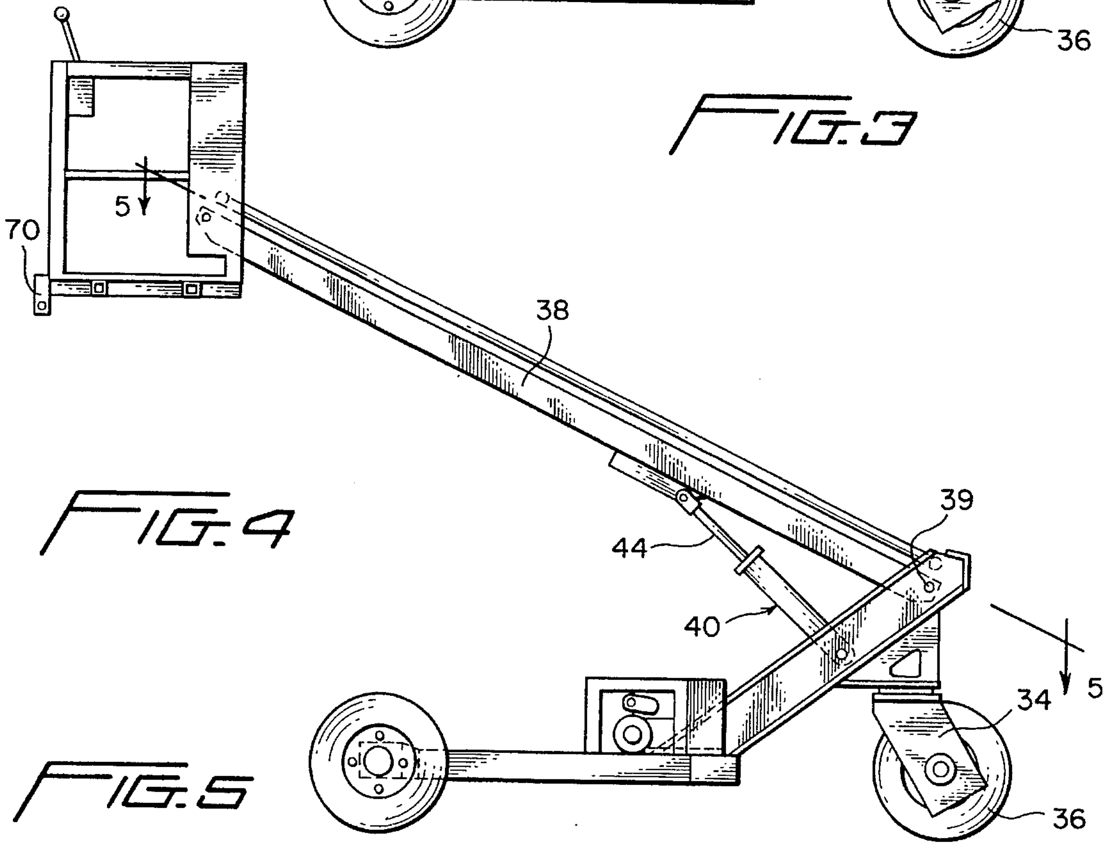
FIG. 4
FIG. 5
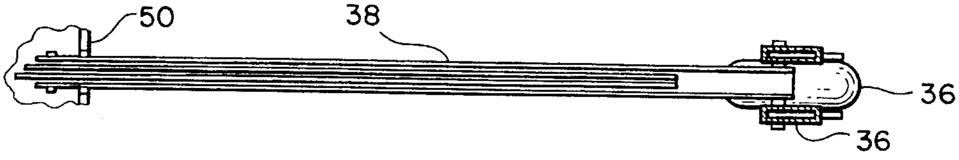

FIG. 11
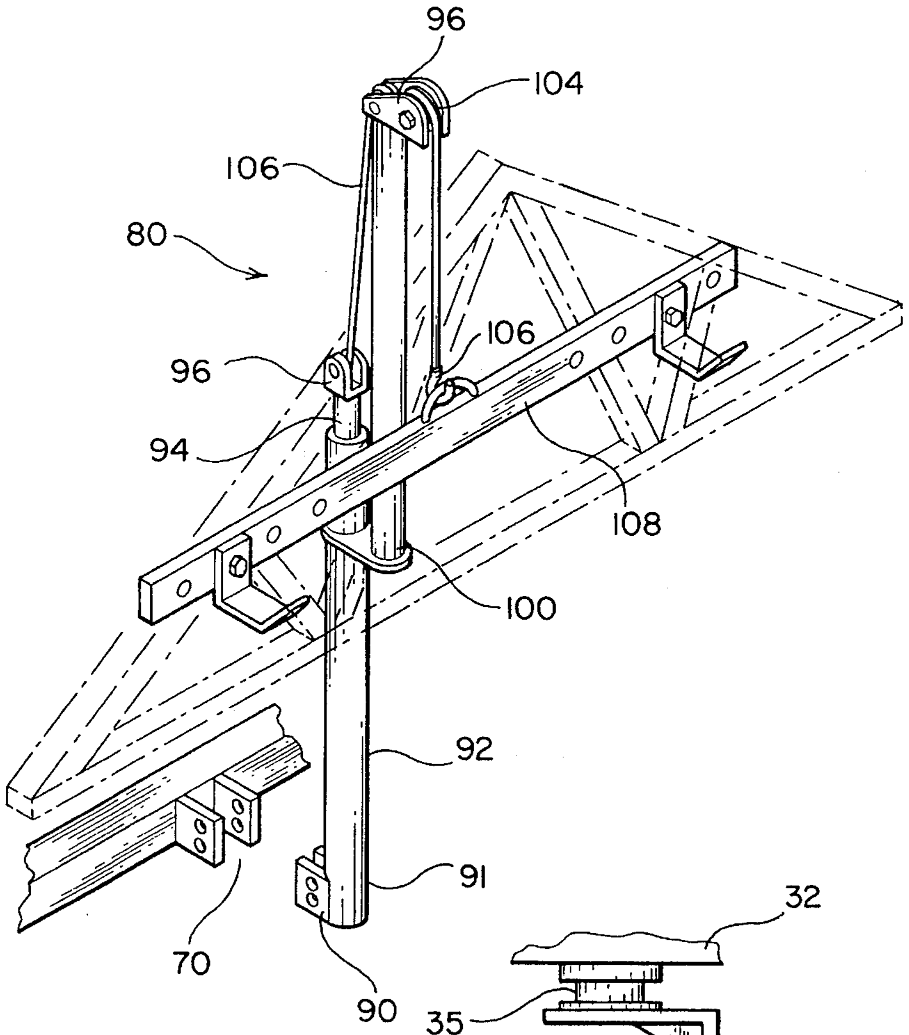
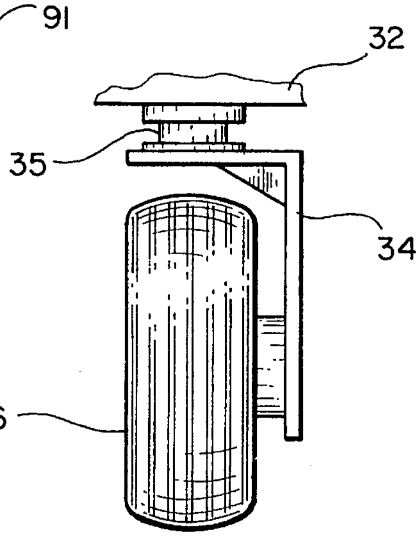
FIG. 12

MULTI-PURPOSE VEHICLE

BACKGROUND OF THE INVENTION

In the erection of buildings, especially buildings such as warehouses and barns, a common building technique known as post frame construction is oftentimes used. In this type of construction a plurality of holes are dug at designated places along the periphery of the building and a series of vertical treated posts or columns are secured therein. Extending from side-to-side atop these posts are pre-formed or prefabricated trusses. The two end trusses form gables and the intermediate trusses with the end trusses form the base for the framing and roofing materials. After the trusses are secured, framing is completed and the upper surfaces of the trusses and framing provide a surface to which the roofing material is secured. The walls of the structure can be equipped with doors, windows and frames as in conventional construction.

In order to construct a building of the type described, a post hole auger is required. Also required is a crane or a lifting machine of some sort to raise the posts or columns, beams, headers and trusses into position. Usually, the manual strength of several men is required to locate the posts which are oftentimes twenty to twenty-five feet long. To lift and secure a truss takes additional personnel and/or expensive equipment. Because of this intensive labor requirement and the need to rent specialized equipment, much of the economic benefits of post frame construction is thereby diminished.

FIELD OF INVENTION

Fortunately, prior to performing the tasks described above, the site for this type of building must be levelled so that the interior floor is level. Also, site preparation will normally call for a levelled surface or apron extending from ten to thirty feet beyond the perimeter of the building. This level, or at least partially level, apron is sufficient area for the compact and maneuverable vehicle described herein to operate effectively.

A primary objective of this invention is to provide a multiple-purpose vehicle that facilitates post frame construction by providing an apparatus that can dig the holes, lift the exterior columns into place and is sufficiently strong and agile enough so that roofing trusses can be lifted and positioned on the columns by the operator of the vehicle. It is advisable to have a worker at the top of each post during truss positioning so that the trusses can be secured to the posts.

Another important objective to this invention is to provide a highly maneuverable vehicle that is uniquely adapted to work in the close confines with which it is presented.

Another important objective of the invention is to provide a vehicle that is supported by two hydraulically driven wheels and a swivel wheel. By driving the wheels in opposite directions, the vehicle can act as a turntable for a beam carried thereon. Stated otherwise, the vehicle itself acts as a turret for its superstructure.

An important objective of the invention is to provide an operator platform or cage at the end of the aforementioned boom. On the chassis or deck of the vehicle there is provided a gas-operated engine for driving a hydraulic pump. The pump provides hydraulic power to motors secured to each of the driven wheels and to a double-acting hydraulic cylinder for vertically pivoting the boom and to a platform mounted motor that will drive an auger and a truss jib or boom when necessary.

Also, it is an important objective of this invention to provide the truss handling mechanism (jib or boom) that can be mounted on the work platform whereby an operator standing on the work platform is in a position to manipulate material or a truss carried thereby. The operator can readily position the construction elements so that other workers can secure them to the building. In locating such building components, the vehicle movement can be considered a coarse adjustment and the truss jib movement as a "fine" adjustment.

An air compressor driven by the main engine, will be mounted on the chassis and is utilized to drive such collateral equipment as air drills, power nailers, and the like.

Another very important objective of the invention is to provide control means in the operator platform for controlling the above-mentioned hydraulic motors.

These and other objectives of the invention will become more apparent when one reads the following specification viewed in light of these drawings.

HISTORY OF THE RELATED ART

In the prior art, self-propelled vehicles with aerial platforms are not unknown. For instance, the device of Morse, U.S. Pat. No. 3,319,739 issued May 16, 1968, discloses hydraulically driven wheels, a boom carried platform and hydraulic controls to permit operation of the device by a workman in the platform. The Morse device has tools that can be operated from the platform or cage but, because of the relatively simple tasks for which it is designed, it is not properly equipped with augers and truss handling equipment without a substantial redesign.

Other prior art references teach boom supported platforms that are controlled by a workman on the platform. For instance, reference is made to the Grove U.S. Pat. No. 3,937,340 issued Feb. 10, 1976. This device appears bulky enough to perform construction tasks but would be of little help in facilitating post frame construction.

BRIEF DESCRIPTION OF THE DRAWINGS

FIG. 2 is a diagrammatic plan view illustrating how the chassis of the vehicle is rotated so as to locate the boom to a selected azimuth;

FIG. 3 is a diagrammatic side elevation;

FIG. 4 is a side elevation with the boom erected and showing the operator's platform mounted at the outer end thereof;

FIG. 5 is a view in the direction of 5—5 of FIG. 4 showing the hydraulic lines nested in the boom itself;

FIG. 11 is a diagrammatic perspective of a different view of the truss jib apparatus; and FIG. 12 is an elevational view of the swivel wheel.

DESCRIPTION OF THE PREFERRED EMBODIMENT

Figure 1:
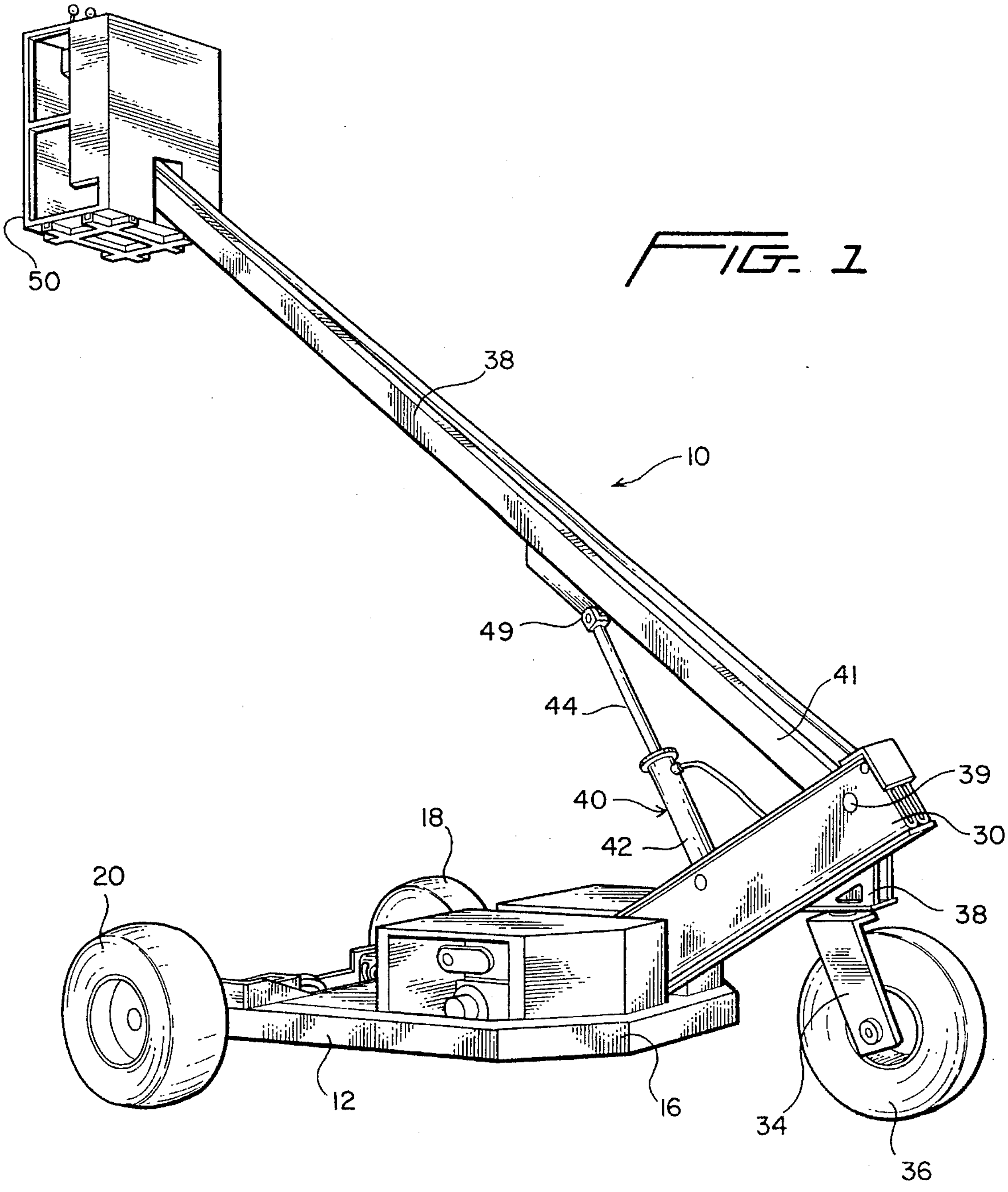
FIG. 1 is a perspective view showing the vehicle of this invention with the boom in an erect position.
Figure 1A:
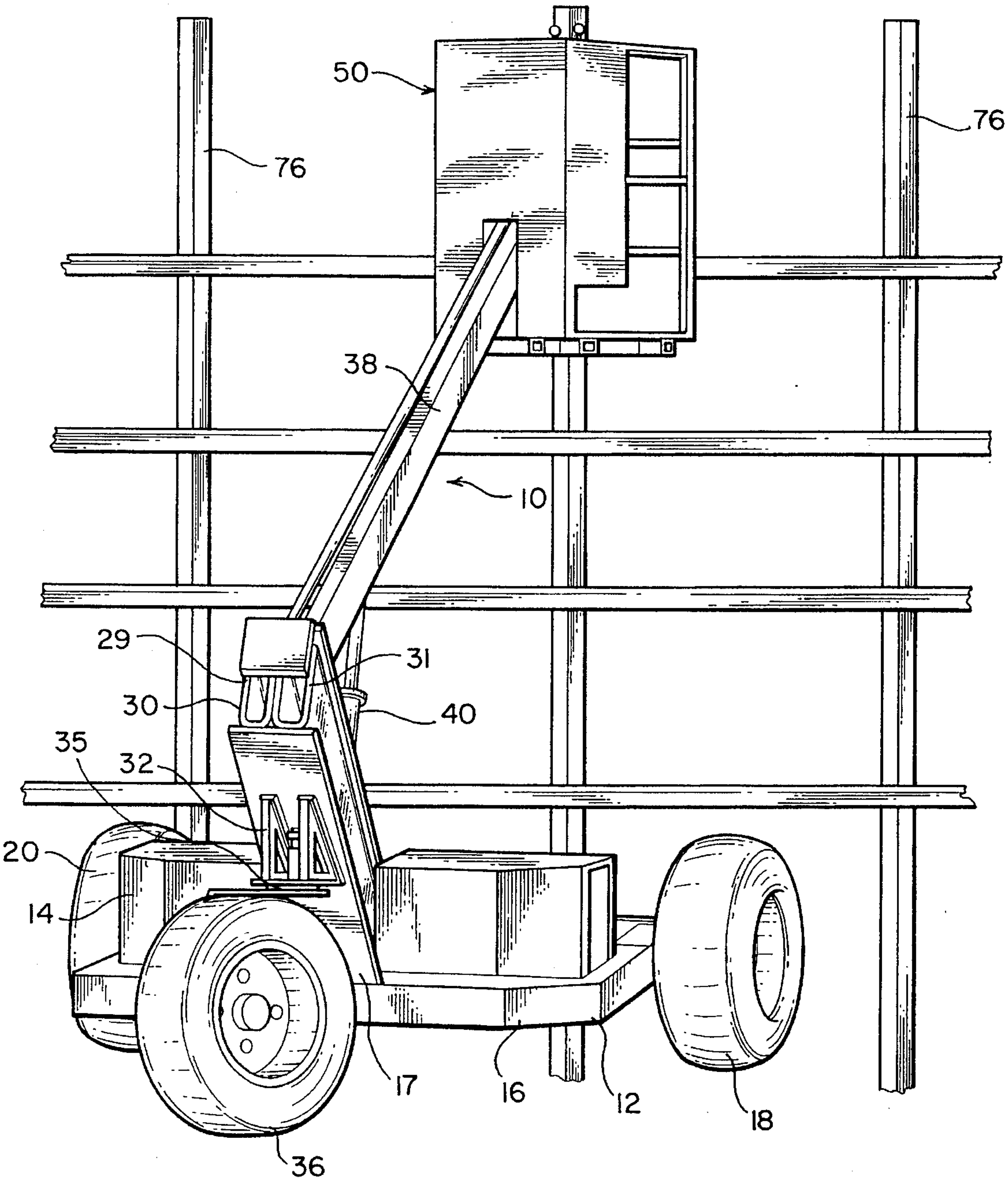
FIG. 1*a* is another perspective view showing the vehicle of FIG. 1 from a different angle.
Figure 7:
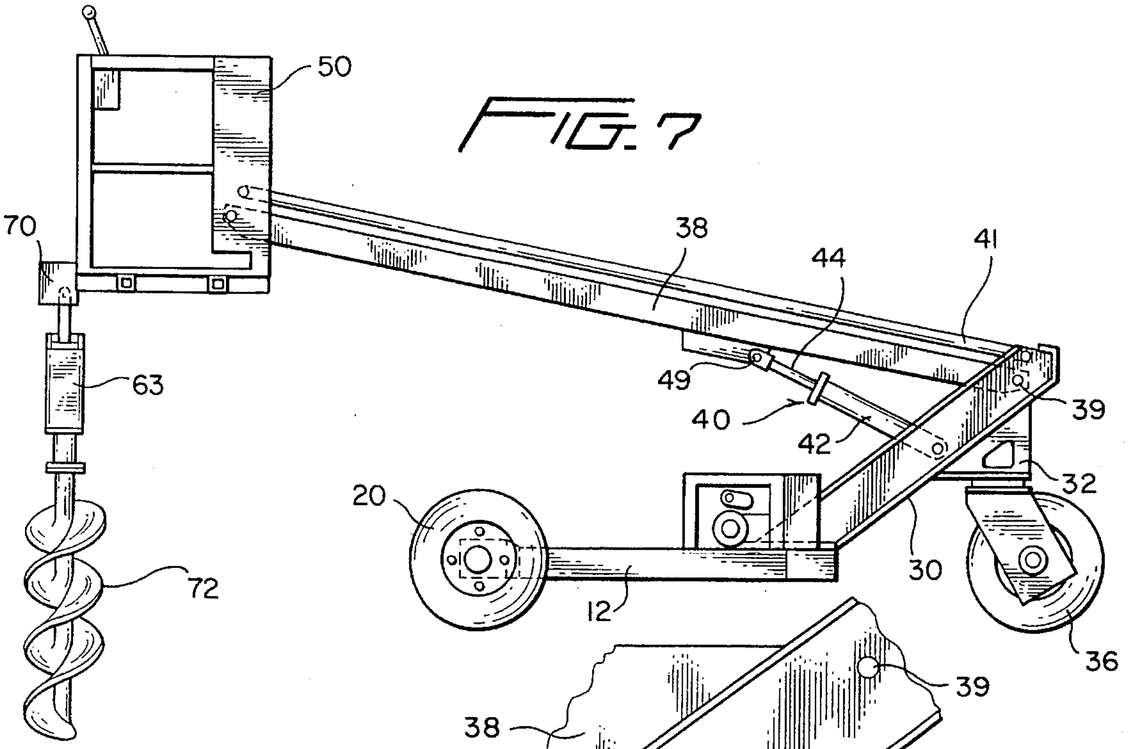
FIG. 7 is a side elevation of the boom and operator's platform with an auger mounted thereto.
Figure 6:
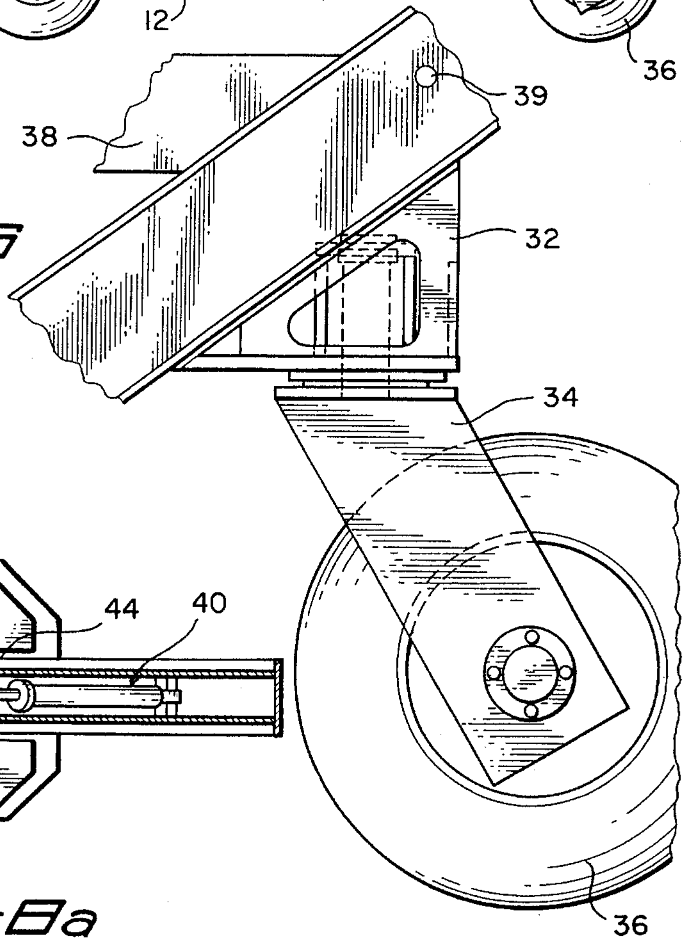
FIG. 6 is a diagrammatic detail of the swivel wheel which is displaced downwardly and rearwardly of the vehicle for enhanced maneuverability.
Figure 8A:
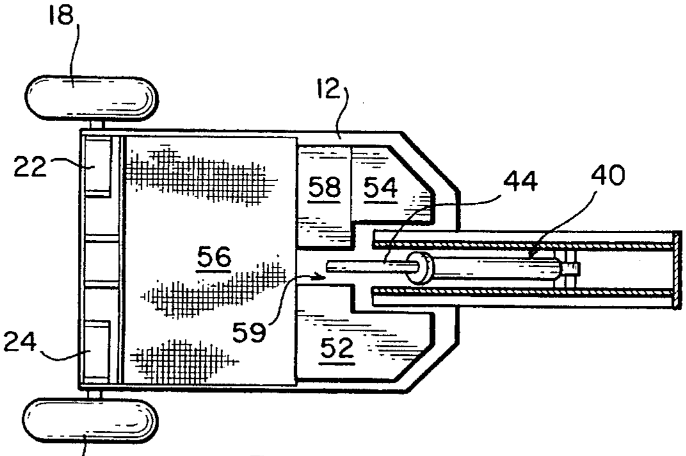
FIG. 8*a* is a top plan of the chassis.
Figure 8:
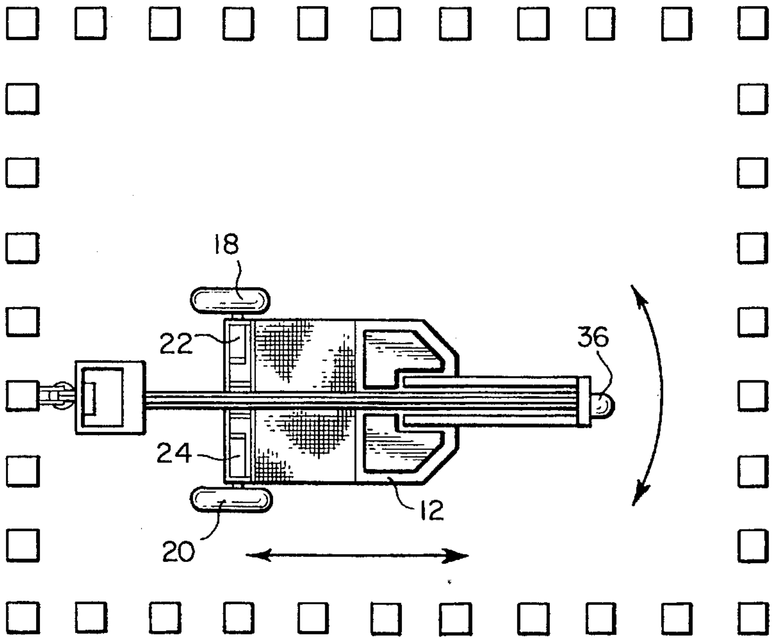
FIG. 8 is a diagrammatic outline of a construction site with possible locations for construction of holes. This figure illustrates how the vehicle can be maneuvered so that an auger can be placed over any of the drilling sites.
Figure 9:
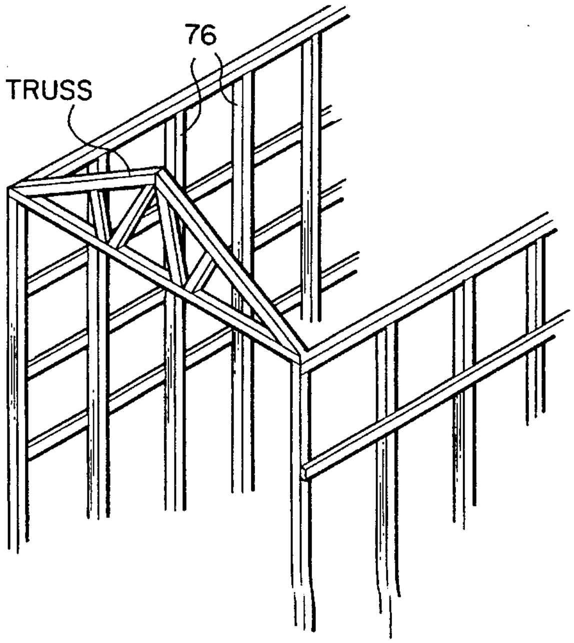
FIG. 9 is a diagrammatic sketch showing the initial studding (posting) and framing with a depiction of how a roofing truss is placed thereon.

Referring now to the drawings wherein like parts are indicated by like numerals, the numeral 10 indicates the vehicle of this invention. The vehicle 10 has a chassis or frame 12 having a generally elongated rectangular shape with tapered portions 14 and 16 leading to a rearward end 17. The front end of the chassis is supported by wheels 18 and 20. These wheels are driven by hydraulic motors 22 and 24 the operation of which will be hereinafter described in greater detail.

Welded and bolted to the mid portion of the rearward end 17 are two angularly and upwardly extending structural tubes 29 and 31, hereinafter referred to as beam 30. The double tube arrangement of beam 30 provides a strength that eliminates the use of side braces, struts and the like. A support 32 is welded to the under surface of beam 30 which support, in turn, supports a swivel wheel bracket 34. The support 32 carries a bushing 35 that rotatably secures the bracket for rotation about a generally vertical axis. A swivel wheel 36 is rotatably mounted to the bracket 34.

A boom 38 is pivotally secured to the upper end of beam 30 about pin 39. The fact that the inner end 41 of boom 38 is elevated a substantial distance above the chassis 12 permits the boom to assume a less than 00 attitude. This is oftentimes important during hole drilling operations with the auger.

At its outer end, the boom 38 supports an operator's work platform 50. The operator controls the power of the vehicle and its maneuverability from platform 50. The boom 38 can be moved vertically upwardly and downwardly by virtue of a hydraulic cylinder 40 which has its base 42 pivotally secured to beam 30 and its piston rod 44 pivotally attached to the lower surface 48 of boom 38 at point 49.

A gasoline motor 52 and a hydraulic pump 54 are secured to the flooring 56 of the chassis 12. A pneumatic air pump 58 is also secured to the chassis. The air pump 58 can be operated directly by the motor 52. Note that the motor 52 and pump 54 are spaced at 59 from one another at 59 so that the operating hydraulic cylinder 40 can be nested therein when the beam 30 is in its lower position.

The operator's platform 50 has a series of motor control levers conveniently located near the operator standing on the platform. A joy stick 60 controls the valve that determines the direction of the hydraulic fluid that determines whether wheels 18 and 20 will rotate clockwise or counterclockwise or in the same direction at the same speed or different speeds. If the wheels 18 and 20 are going in the same direction, the vehicle will move backward or forward. In the event wheel 18 is directed to turn in one direction and the wheel 20 in the opposite direction, the vehicle 10 itself will act as a turntable or turret so as to locate the boom at the proper azimuth.

A lever 60*a* controls the expansion or contraction of the double acting hydraulic cylinder 40. This will determine the angular disposition of the boom 38 with respect to the ground and thus the height of the work platform 50. A third hydraulic motor (not shown) is disposed within the platform 50 and is under the control of a foot pedal 68.

Forwardly of the platform 50 is a bracket 70 to which a digging auger 72 can be attached. A conventional mechanical connection 63 is provided between a hydraulic motor 62 and the auger 72 for operating same. The auger is rotated and operated from the platform carried motor. This motor is under the control of the operator within the platform by foot pedal 68.

In normal operation the auger 72 digs the holes for posts 76 and is thereafter removed and replaced by the truss jib mechanism A truss jib 80 is used to maneuver and locate posts for insertion into their holes and to lift and manipulate trusses, beams and headers into position so that carpenters at each opposite post can properly attach the ends of the trusses, beams, etc. to the top of opposite side posts.

With the use of the joy stud 60*a*, the operator can raise or lower his platform while he is maneuvering or operating the auger or jib.

Figure 10:
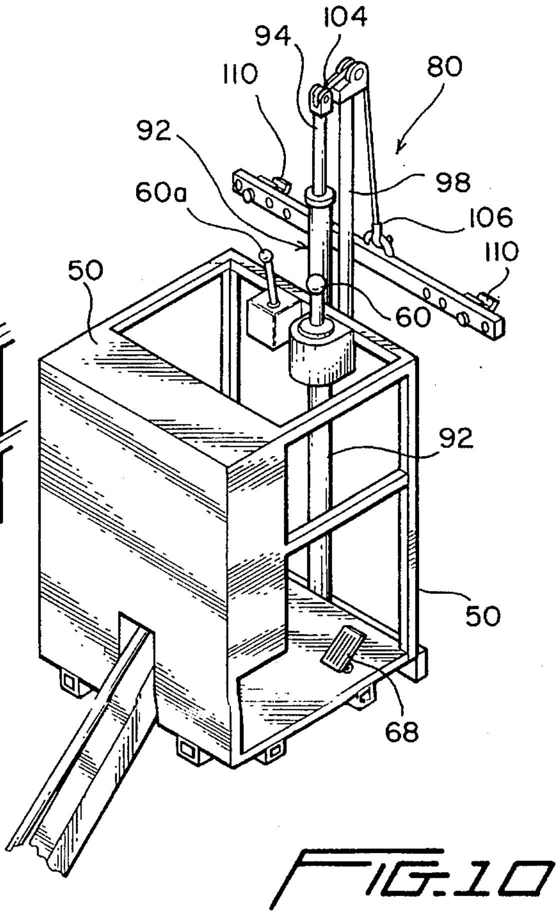
FIG. 10 is a diagrammatic perspective view of a truss jib apparatus for maneuvering the truss into position.

The truss handling mechanism is best seen in FIGS. 10 and 11. When the auger assembly is removed, the jib assembly can be affixed to bracket 70 via the bracket 90 and appropriate bolts. The bracket 90 carries the base 91 of a hydraulic cylinder 92 that is equipped with a piston 94. At the upper or outer end of piston 94 is a cable locking bracket 96 for securing a first end of a cable 106. A standard 98 has a lower end 100 supported by a bracket 102 that is affixed to cylinder 92.

At its upper end, the standard 98 supports a sheave 104. One end of a cable 106 is affixed to the member 96 and then traverses the sheave 104 and extends downwardly therefrom. At its outer end, the cable carries a hook 106. The hook can carry a variety of materials. In FIGS. 10 and 11, the hook carries a carrier board 108, along which some movable hooks 110 are secured. The hooks are located along the carrier at distances from one another so that truss members of different sizes can be conveniently maneuvered.

As mentioned previously, the ground about the building is normally level so that there is at least an apron as wide as the vehicle. With truss jib 80, it is quite easy for an operator to insert the bottom end of the posts into each hole. Then, using conventional practices, the posts are aligned vertically and secured by conventional practices. Pre-cast pads are often used or concrete is poured into each hole. The bottom ends of the posts are inserted into the holes and they are held in a vertical position until the concrete is set.

The trusses are then lifted to upper ends of the posts on opposite lateral sides through the use of the carrier board 108. Using the jib 80, the relatively heavy trusses can be raised into position so that their ends are positioned atop a pole on either side thereof. Carpenters located at this point can readily secure the truss to the top of the posts in a conventional manner. After all of the trusses are in position, the framing and roofing is completed. The framing material, roof purlins, roofing materials, etc. are all lifted and located at convenient positions for the workers by the unit.

There has been described a narrow wheel-based vehicle which permits the erection of a post frame building with perhaps only one or two extra workers. Also, because there is usually a relatively level apron about the exterior of a building, the vehicle can be manipulated quite readily along this apron so that the sheathing can also be lifted into position so that exterior supports are not required. The vehicle is also so maneuverable so that it can be used interiorly of the building for the installation of interior walls and ceilings. There has been described a mobile vehicle having an aerial lift platform of outstanding versatility and flexibility which results in substantial cost saving benefits to the builder for this type of post frame construction.

With the above components, an operator standing on the platform can maneuver the vehicle in any direction he wishes and to any site location by controlling steering and direction via the driven wheels themselves. Also, he can vary the vertical height of the work platform by operating a hydraulic cylinder provided for that purpose, the operator can drill holes at selected locations with the auger provided for that purpose, he can handle building materials for the benefit of himself and fellow carpenters through the use of the truss lib, and can deliver materials or tools to points of use at ground level or at the upper reaches of the building, or the platform is a low pressure directional valve to control wheel direction and speed. On the floor of the platform is a foot pedal low pressure, directional valve to control the lift cylinder. Also, on the platform about waist high, is a lever controlled directional valve for the auger and jib.

It will be obvious to those skilled in the art that various changes can be made in the vehicle without departing from the spirit of the invention, and therefore, the invention is not specifically limited to what is shown on the drawings and described in this specification, but as defined in the claims hereof.

We claim:

1. A self-propelled vehicle for use in the construction of buildings comprising in combination:

a frame;

first and second ground engaging wheels connected to said frame;

a support beam having a base end secured to said frame and extending angularly upwardly to a distal end;

a swivel wheel;

first means supporting said swivel wheel below said distal end of said beam and having a length causing said swivel wheel, together with first and second wheels, to support said frame;

a boom having an inner end pivotally mounted to said distal end of said beam;

a hydraulic cylinder having a base connected to said support beam;

a piston rod extending from said cylinder and having its outer end connected to said boom;

an operator platform;

second means mounting said platform at the outer end of said beam;

a power source mounted on said frame and said power source having an output;

a hydraulic pump;

means connecting said output to said pump;

first and second hydraulic motors respectively connected to said first and second wheels for rotating said wheels;

first and second conduits extending between said pump and said first and second motors; and a first hydraulic control means mounted on said platform across said conduits between said pump and said motors for rotating said wheels in opposite or the same direction;

a bracket extending from said operator platform to which a variety of equipment can be attached;

a third hydraulic motor associated with said operator platform;

a third conduit connecting said pump to said third motor;

an operator control on said platform for operating said third motor, and connection means ween said third motor and any of said equipment which is supported by said bracket.

2. The vehicle of claim 1 wherein said first hydraulic control means can rotate said first and second wheels at varying speeds.

3. The vehicle of claim 1 wherein said support beam is comprised of first and second structural tubes.

4. The vehicle of claim 1 wherein:

a digging auger is supported by said bracket; and said third hydraulic motor is operatively connected to said digging auger.

5. The vehicle of claim 1 wherein:

a truss jib is removably secured to said bracket and is operatively connected to said third hydraulic motor.

6. The vehicle of claim 1 wherein an air compressor is mounted on said frame and operatively connected to said power source.

7. The vehicle of claim 2 wherein a truss jib is connected to said bracket and said truss jib comprises:

a hydraulic cylinder having a base and a piston rod;

means mounting said base to said bracket;

a standard extending upwardly from said bracket parallel to said piston rod;

a sheave mounted to the outer end of said standard;

a spreader bar to support a truss thereon;

a cable having first end connected to said piston rod, a second end connected to said spreader bar and an intermediate portion about said sheave whereby movement of said piston rod will cause a corresponding movement of said spreader bar.

* * * * *